3,400,131
1,3-DI(4-PYRIDYL)-2-PROPANOL DERIVATIVES
Bernard Brust, Parsippany, Troy Hills, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 349,771, Mar. 5, 1964. This application June 21, 1965, Ser. No. 465,754
6 Claims. (Cl. 260—294.8)

ABSTRACT OF THE DISCLOSURE 1,3-di(4-pyridyl)-2-propanol derivatives are prepared by reacting a picolyl metal compound with a halide of a heterocyclic carboxylic acid. The compounds exhibit among other pharmocological properties, the ability to diminish Tremorine induced tremors and to inhibit enzymatic oxidative reactions of the liver microsomal drug metabolizing enzymes.

Ths application is a continuation-in-part of application Ser. No. 349,771, filed Mar. 5, 1964, now abandoned.

This invention relates, in general, to a novel class of compounds. More particularly, the invention relates to therapeutically active pyridyl compounds and to processes for producing same.

The novel compounds of this invention have the structural formula as follows:

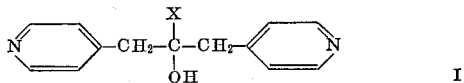

in which the symbol X represents a member selected from the group consisting of a 5-member heterocyclic radical, a lower alkyl-substituted 5-member heterocyclic radical, a 6-member heterocyclic radical and a lower alkyl-substituted 6-member heterocyclic radical.

In one preferred embodiment of the invention, the symbol X in Formula I represents a pyridyl, furyl, thienyl or pyrrolyl radical or a lower alkyl-substituted pyridyl, furyl, thienyl or pyrrolyl radical. In a more limited preferred embodiment of the invention, the symbol X represents a pyridyl, furyl or thienyl radical.

Additionally, the invention embraces within its scope salts of the compounds of Formula I with medicinally acceptable acids, such as, hydrochloric acid, sulfuric acid, p-toluene sulfonic acid, etc.

The compounds of Formula I, and the acid addition salts thereof, relieve or diminish tremors which are brought about in animals by Tremorine, i.e., 1,4-di-pyrrolidino-2-butyne with a minimum of peripheral anticholinergic side effects. Additionally, they reduce hypothermia produced by Tremorine. Thus, the compounds are indicated for use in the study of the treatment of tremors which are characteristic of Parkinson's Disease. Furthermore, the compounds of this invention alter the activity of the liver microsomal drug metabolizing enzymes. For example, they inhibit the following enzymatic oxidative reactions: hexobarbital to ketohexobarbital, acetanilid to p-hydroxyacetanilid, amphetamine to phenylacetone, dilantin to its p-hydroxy derivatives, etc. On prolonged administration the compounds of this invention stimulate the activity of the liver microsomal drug metabolizing enzymes. Because of their activity, these compounds provide a valuable tool for the study of the drug metabolizing enzyme systems associated with the liver microsomes and are useful in the study and treatment of diseases caused by metabolic failures of such enzyme systems, for example, in the treatment of phenylketonuria.

The compounds of this invention are readily prepared. In one suitable procedure, a picolyl metal compound having the formula

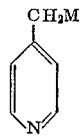

in which the symbol M represents sodium, potassium or lithium is reacted with a halide, e.g. a chloride, of a 5-member heterocyclic carboxylic acid; or with a halide, e.g., a chloride, of a 6-member heterocyclic carboxylic acid; or with a halide, e.g., a chloride, of a lower alkyl-substituted derivative of such a 5- or 6-member heterocyclic carboxylic acid. Thus, in the practice of this invention, the Formula II compound is reacted, for example, with a halide of a pyridine carboxylic acid, such as, for example, with a halide of a pyridine carboxylic acid, such as, 2-pyridine-carboxylic acid, 4-pyridine-carboxylic acid, etc.; or with a halide of a furoic acid, such as, 2-furoic acid; or with a halide of a thiophene-carboxylic acid, such as 2-thiophene-carboxylic acid; or with a halide of a pyrrol-carboxylic acid, such as, 2-pyrrol-carboxylic acid. Additionally, halides of lower alkyl-substituted derivatives of the named 5- and 6-member heterocyclic carboxylic acids can also be used. These include, for example, methyl, ethyl, propyl, butyl, etc. substituted derivatives of the acids. Furthermore, halides of the acids other than chlorides can be employed, if desired.

In an alternate method for producing the compounds of Formula I, the picolyl metal compound of Formula II is reacted with an alkyl, phenyl or benzyl ester of a 5-member heterocyclic carboxylic acid or with an alkyl, phenyl or benzyl ester of a 6-member heterocyclic carboxylic acid or with an alkyl, phenyl or benzyl ester of a lower alkyl-substituted 5- or 6-member heterocyclic carboxylic acid. Thus, in such embodiment of the invention, the picolyl metal compound of Formula II is reacted, for example, with an alkyl, phenyl or benzyl ester of a pyridine-carboxylic acid, a furoic acid, a thiophene carboxylic acid, or a pyrrol carboxylic acid or with an alkyl, phenyl or benzyl ester of a lower alkyl-substituted derivative of such a 5- or 6-member heterocyclic carboxylic acid. More specifically, the compounds of Formula I are obtained by reacting the picolyl metal compound of Formula II with an alkyl ester, such as, a methyl, ethyl, propyl, butyl, etc. ester of, for example, 2-pyridine carboxylic acid, 4-pyridine carboxylic acid, 2-furoic acid or 2-thiophene carboxylic acid; the benzyl ester of, for example, 2-pyridine carboxylic acid, 4-pyridine carboxylic acid, 2-furoic acid or 2-thiophene carboxylic acid; the phenyl ester of, for example, 2-pyridine carboxylic acid, 4-pyridine carboxylic acid, 2-furoic acid or 2-thiophene carboxylic acid; or with an alkyl ester, i.e., methyl, ethyl, propyl, butyl, etc. esters or benzyl or phenyl esters of 5- or 6-member heterocyclic acids other than those named heretofore; or with esters of lower alkyl-substituted 5- or 6-member heterocyclic carboxylic acids.

In carrying out the invention, by either or the aforementioned procedures, there is used, preferably, a ratio of at least 2.0 moles of the picolyl metal compound of Formula II for each mole of acid halide or ester employed. Obviously, however, a larger or smaller quantity of the picolyl metal compound can be used, if desired.

In producing the present compounds, the 4-picolyl metal compound is, in a first step, dissolved or suspended in a suitable solvent. In preparing such solution or suspension

chloride dissolved in 150 ml. of tetrahydrofuran. The addition of the acid chloride solution was carried out in a dropwise fashion over a period of about sixty minutes. The reaction mixture was stirred overnight, the temperature thereof being maintained at about −30° C., following which it was diluted with 100 ml. of water. The reaction mixture was then extracted three times, using 150 ml. portions of 6 N hydrochloric acid each time. The acid extracts were combined and washed three times, using 150 ml. portions of ether each time. The reaction product was then liberated from the reaction mixture by stirring the mixture with 500 grams of ice and 300 ml. of concentrated ammonium hydroxide. During this step of the process, the reaction mixture was maintained at a temperature of about 0° C.

The mixture obtained as described in the preceding paragraph was filtered, yielding a white crystalline solid, which solid was subsequently shaken vigorously with 400 ml. of water and 100 ml. of methylene chloride. Filtration of this mixture yielded 2 - (2-furyl)-1,3-di(4-pyridyl)-2-propanol, which, upon after recrystallization four times from ethanol, was obtained in the form of colorless prisms melting at 142° to 144° C.

Example 4

In this example 0.2 mole of 2-thiophene-carboxylic acid chloride, dissolved in 150 ml. of tetrahydrofuran, was added in a dropwise fashion over a period of about 60 minutes to a stirred solution of 0.5 mole of 4-picolyl lithium dissolved in tetrahydrofuran. The addition of the acid chloride reactant was accomplished under an atmosphere of dry nitrogen and the 4-picolyl lithium solution was cooled to a temperature of about −30° C. prior to the addition of the acid chloride thereto. The reaction mixture which was thus obtained was stirred overnight. Thereafter, the reaction mixture was diluted with 100 ml. of water and extracted three times using 150 ml. portions of 6 N hydrochloric acid each time. The acid extracts were then combined, washed three times using 150 ml. portions of ether each time and the desired compound liberated by adding the reaction mixture to and stirring same in a mixture of 500 grams of ice and 300 ml. of concentrated ammonium hydroxide. During this step of the process, ice was added, as necessary, to maintain a temperature of about 0° C.

The mixture which was obtained as described in the preceding paragraph was filtered to yield a product in the form of yellow solids. This product was recrystallized from ethanol in water to yield 1,3-di(4-pyridyl)-2-(2-thienyl)-2-propanol in the form of yellow needles melting at 96° to 99° C.

Example 5

This example is included herein to demonstrate the preparation of dosage forms containing as the active ingredient a representative compound of this invention.

(a) Capsule Formulation: 5 mg. of 1,3-di(4-pyridyl)-2-(2-pyridyl)-2-propanol were mixed with 170 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet Formulation: 10.2 mg. of 1,3-di(4-pyridyl)-2-(2-pyridyl)-2-propanol were mixed with 79.30 mg. of lactose, U.S.P., 10.0 mg. of corn starch and 0.5 mg. of magnesium stearate. The mixture was blended by passing through a Fitzpatrick Comminuting Machine, fitted with a No. 1A screen with knives forward. The powder was then slugged on a tablet compressing machine, following which the slugs were comminuted using a No. 16 screen. The mixture was compressed at a tablet weight of 100 mg. using tablet punches having a diameter of approximately ¼ inch.

(c) Parenteral Formulation: 10.0 mg. of 1,3-di(4-pyridyl) - 2 - (2 - pyridyl) - 2 - propanol were slurried in a small amount of water. To the slurry there was added slowly 1 N hydrochloric acid to pH of 3.0. The solution was filtered and allowed to stand for twenty-four hours. Thereafter, the filtrate was filtered through a 02 Selas candle. The filtrate was then filled into ampuls, under an atmosphere of nitrogen, which were then sealed. The ampuls were sterilized for twenty minutes at a temperature of 250° F.

Example 6

This example is included herein to demonstrate the preparation of dosage forms containing as the active ingredient another representative compound of this invention.

(a) Capsule Formulation: 25 mg. of 1,2,3-tri(4-pyridyl)-2-propanol were mixed with 150 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet Formulation: 5.10 mg. of 1,2,3-tri(4-pyridyl)-2-propanol were mixed with 84.40 mg. of lactose, U.S.P., 10.0 mg. of corn starch and 0.5 mg. of magnesium stearate. The mixture was blended by passing through a Fitzpatrick Comminuting Machine, fitted with a No. 1A screen with knives forward. The powder was then slugged on a tablet compressing machine following which the slugs were comminuted using a No. 16 screen. The mixture was compressed at a tablet weight of 100 mg. using tablet punches having a diameter of approximately ¼ inch.

(c) Parenteral Formulation: 10 mg. of 1,2,3-tri-(4-pyridyl)-2-propanol were slurried in a small amount of water. To the slurry there was added slowly 1 N hydrochloric acid to pH of 3.0. The solution was filtered and allowed to stand for twenty-four hours. Thereafter, the filtrate was filtered through a 02 Selas candle. The filtrate was then filled into ampuls, under an atmosphere of nitrogen, which were then sealed. The ampuls were sterilized for twenty minutes at a temperature of 250° F.

What is claimed is:

1. A compound selected from the group consisting of a member having the formula:

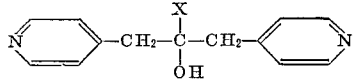

in which X is a member selected from the group consisting of pyridyl, furyl, thienyl and pyrrolyl,
and salts thereof with medicinally acceptable acids.

2. The compound of claim 1 wherein X is a 2-pyrrolyl radical.

3. 1,2,3-tri(4-pyridyl)-2-propanol.

4. 1,3-di(4-pyridyl)-2-(2-pyridyl)-2-propanol.

5. 2-(2-furyl)-1,3-di(4-pyridyl)-2-propanol.

6. 1,3-di(4-pyridyl)-2-(2-thienyl)-2-propanol.

References Cited

Burger, Medicinal Chemistry second ed. Interscience, (1960) p. 78, RS. 403B8.

HENRY R. JILES, *Primary Examiner.*

AL ROTMAN, *Assistant Examiner.*